United States Patent
Jones et al.

(10) Patent No.: US 10,836,954 B2
(45) Date of Patent: Nov. 17, 2020

(54) MICROBIAL VISCOSITY BREAKER COMPOSITIONS

(71) Applicant: SOLVAY USA INC., Princeton, NJ (US)

(72) Inventors: Chris Jones, Walsall (GB); Jean Molina, Midland, TX (US); Francis Smith, Hamilton Square, NJ (US); Henry Wiggins, Snyder, TX (US); Dru Bishop, The Woodlands, TX (US)

(73) Assignee: Solvay USA Inc., Princeton, NJ (US)

(*) Notice: Subject to any disclaimer, the term of this patent is extended or adjusted under 35 U.S.C. 154(b) by 212 days.

(21) Appl. No.: 15/198,145

(22) Filed: Jun. 30, 2016

(65) Prior Publication Data

US 2017/0002259 A1    Jan. 5, 2017

Related U.S. Application Data (60) Provisional application No. 62/188,012, filed on Jul. 2, 2015.

(51) Int. Cl.
| | |
|---|---|
| C09K 8/035 | (2006.01) |
| C09K 8/60 | (2006.01) |
| C09K 8/68 | (2006.01) |
| C09K 8/88 | (2006.01) |
| C09K 8/70 | (2006.01) |

(52) U.S. Cl.
CPC .............. C09K 8/605 (2013.01); C09K 8/035 (2013.01); C09K 8/68 (2013.01); C09K 8/706 (2013.01); C09K 8/882 (2013.01); C09K 2208/26 (2013.01)

(58) Field of Classification Search
None
See application file for complete search history.

(56) References Cited

U.S. PATENT DOCUMENTS

| | | | |
|---|---|---|---|
| 2009/0229827 A1 | 9/2009 | Bryant et al. | |
| 2010/0204068 A1 | 8/2010 | Kesavan et al. | |
| 2011/0034352 A1 | 2/2011 | Lin et al. | |
| 2014/0080792 A1* | 3/2014 | Jones | C02F 1/50 514/129 |
| 2014/0332213 A1 | 11/2014 | Zhou et al. | |
| 2014/0374103 A1* | 12/2014 | Seth | C02F 1/76 166/305.1 |
| 2014/0374104 A1* | 12/2014 | Seth | C02F 1/725 166/305.1 |
| 2017/0044035 A1* | 2/2017 | Underwood | C02F 1/722 |

FOREIGN PATENT DOCUMENTS

| | | |
|---|---|---|
| CN | 104109525 A | 10/2014 |
| CN | 104610954 A | 5/2015 |
| WO | 01/53602 A1 | 7/2001 |
| WO | 200153602 A1 | 7/2001 |
| WO | 2010093473 A1 | 8/2010 |

\* cited by examiner

*Primary Examiner* — Jeffrey D Washville (57) ABSTRACT

A well treatment fluid composition that includes a tetrakis (hydroxyorgano)phosphonium salt and at least one oxidizing viscosity breaker. Methods for preparing a microbial viscosity breaker composition and treating a subterranean formation are also presented.

11 Claims, 10 Drawing Sheets

MICROBIAL VISCOSITY BREAKER COMPOSITIONS

CROSS-REFERENCE TO RELATED APPLICATION

The present application claims the benefit of priority under 35 U.S.C. § 119(e) of U.S. Provisional Application Ser. No. 62/188,012, filed on Jul. 2, 2015, the entire disclosure of which is incorporated herein by reference.

BACKGROUND

In the petroleum industry it is an increasingly common practice to perform a procedure known as a slickwater fracturing. This is a method of stimulating the production of hydrocarbons from a well by pumping water at high rates into the well, thus creating a fracture in the productive formation. Practical and cost considerations for these treatments require the use of materials to reduce pumping pressure by reducing the frictional drag of the water against the well tubulars. Polyacrylamide polymers are very widely used for this purpose.

One ongoing problem with the use of these polymers is their persistence. A large fraction of the polyacrylamide used in a slickwater treatment frequently stays within the producing formation. This has several ill effects on the desired goal of stimulating production: the polymer residue may actually plug some of the permeability of the rock; it may hinder recovery of the water used in the fracturing treatment; and it provides a source of nitrogen that can support the growth of bacteria in the well. Polyacrylamide that is not absorbed but that remains in solution in recovered water will also make disposal of that water more difficult. These problems can be addressed by adding a viscosity breaker to a well treatment fluid that contains a polyacrylamide friction reducer.

Another source of problems associated with well treatment fluids is bacterial contamination of drilling fluids such as fracturing fluids. For example, microorganisms in oilfields or in injection water where water is collected from ponds or similar water sources may include iron-oxidizing bacteria, sulfate-reducing bacteria, slime-forming bacteria, sulfide oxidizing bacteria, yeast and molds, and protozoa. Biocides are used to treat water and destroy bacteria or a substantial amount of bacteria during a biocide treatment.

However, it is a common belief that non-oxidizing biocides are not compatible with oxidizing viscosity breakers because the presence of an oxidizer in the well treatment fluid will inhibit the ability of the biocide to control microbial populations. Therefore, a need exists in the field for effective biocidal viscosity breaker systems.

SUMMARY

The present disclosure provides a well treatment composition that includes a tetrakis(hydroxyorgano)phosphonium salt ("THP salt") and at least one oxidizing viscosity breaker. In certain embodiments, the tetrakis(hydroxyorgano)phosphonium salt is selected from tetrakis(hydroxymethyl)phosphonium sulphate, tetrakis(hydroxymethyl)phosphonium chloride, tetrakis(hydroxymethyl)phosphonium phosphate, tetrakis(hydroxymethyl)phosphonium nitrate and tetrakis(hydroxymethyl)phosphonium oxalate. In certain embodiments, the tetrakis(hydroxyorgano)phosphonium salt is present in an amount from about 40 ppm to about 250 ppm.

In certain embodiments, the composition further includes a quaternary ammonium compound. In certain embodiments, the quaternary ammonium compound is present in an amount from about 5 ppm to about 50 ppm.

In certain embodiments, the composition further includes a polymer of an unsaturated carboxylic acid or a copolymer of an unsaturated carboxylic add with a sulphonic acid, said polymer or copolymer being terminated by a mono- or di-phosphonated unsaturated carboxylic add group or having such monomers incorporated into the polymer backbone. In certain embodiments, the polymer or copolymer is terminated by vinylphosphonic acid (VPA) or vinylidene-1,1-diphosphonic acid (VDPA) or has such monomers incorporated into the polymer backbone.

In certain embodiments, the oxidizing viscosity breaker is selected from hydrogen peroxide, sodium persulfate, encapsulated ammonium persulfate, and sodium chlorite. In certain embodiments, the oxidizing viscosity breaker is present in an amount from about 15 ppm to about 250 ppm.

The present disclosure also provides a method for preparing a microbial viscosity breaker composition that includes the steps of: obtaining a composition according to the present disclosure; and diluting the composition to form a diluted composition.

The present disclosure also provides a method for treating a subterranean formation that includes the step of introducing a composition according to the present disclosure into the formation.

DETAILED DESCRIPTION

In general, well treatment compositions according to the present disclosure include a tetrakis(hydroxyorgano)phosphonium salt ("THP salt") and at least one oxidizing viscosity breaker. Experimental results surprisingly indicate that a THP salt and oxidizing breakers can be used simultaneously in well treatment fluids while still performing effectively.

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "well treatment fluid" is meant to encompass partial and/or complete compositions suitable for introduction into a wellbore or subterranean formation. Well treatment fluids include, but are not limited to, hydraulic fracturing fluids.

In certain embodiments, the well treatment fluid includes the oxidizing viscosity breaker in an amount from about 15 ppm to about 250 ppm active ingredient (e.g. breaker).

In certain embodiments, the well treatment fluid includes a THP salt in an amount from about 40 ppm to about 250 ppm active ingredient. In certain embodiments, the THP salt is tetrakis(hydroxymethyl)phosphonium sulphate ("THPS"). Other THP salts include the phosphite, bromide, fluoride, chloride, phosphate, carbonate, acetate, formate, citrate, borate, and silicate.

In certain embodiments, the well treatment fluid includes a THP salt, a quaternary ammonium compound, and an oxidizing viscosity breaker. In a particular embodiment, the quaternary ammonium compound is benzalkonium chloride. In certain embodiments, the quaternary ammonium compound is present in an amount from about 5 ppm to about 50 ppm.

In certain embodiments, the well treatment fluid includes a THP salt, a polymer of an unsaturated carboxylic acid or a copolymer of an unsaturated carboxylic acid with a sulphonic acid, the polymer or copolymer being terminated by a mono- or di-phosphonated unsaturated carboxylic add group or having such monomers incorporated into the polymer backbone. In certain embodiments, the polymer or copolymer is either terminated by vinylphosphonic acid (VPA) or vinylidene-1,1-diphosphonic acid (VDPA) or has such monomers incorporated into the polymer backbone; accordingly the polymer may be a random copolymer incorporating VPA and/or VDPA monomers.

In other embodiments, the polymer is a polyacrylate or an acrylate/sulphonate copolymer. In certain embodiments, the polymer is a polyacrylate terminated with vinylphosphonic acid, (hereinafter "VPA end-capped polymer") or with vinylidene-1,1-diphosphonic acid (hereinafter "VDPA end-capped polymer"), or is a polyacrylate incorporating VPA and/or VDPA monomers. In other embodiments, the polymer is an acrylate/sulphonate copolymer terminated with vinylidene-1,1-diphosphonic acid (hereinafter "VDPA end-capped copolymer") or with vinylphosphonic acid (hereinafter "VPA end-capped co-polymer"), or is an acrylate/sulphonate copolymer incorporating VPA and/or VDPA monomers.

In certain embodiments, the ratio of VPA or VDPA end-capped polymer or copolymer to THP salt, is, when expressed as a percentage by weight, in the range of from 0.5 to 50%, such as from 0.5 to 30%; preferably from 1 to 25%, such as from 1 to 20%, for example from 1 to 10% or from 2 to 8%; most preferably from 1 to 5%, for example from 3 to 5% (based upon active solids and upon a 1 to 74%, for example a 50%, active THP salt formulation).

In certain embodiments, the oxidizing viscosity breaker is selected from peroxides (e.g. hydrogen peroxide), persulfates (e.g. sodium persulfate ("SP"), encapsulated ammonium persulfate ("AP")), and chlorites (e.g. sodium chlorite ("SC")).

In certain embodiments, the oxidizing viscosity breaker is present in the well treatment fluid in an amount that is effective to reduce the viscosity of the fluid. In certain embodiments, the breaker is present in an amount of at least about 0.25 gallons of dilute solution containing the breaker per thousand gallons of well treatment fluid (gpt), in some cases at least about 0.5 gpt, and can be up to about 1.5 gpt, in some cases up to about 3.0 gpt. In other embodiments, the breaker is present in an amount of at least about 0.25 pounds of dilute solution containing the breaker per thousand gallons of well treatment fluid (ppt), in some cases at least about 0.5 ppt, and can be up to about 2.0 ppt, in some cases up to about 3.0 ppt. The amount of dilute solution containing a breaker used in the friction reducing treatment solution can be any value or range between any of the values recited above. In certain embodiments, the dilute solution contains from about 5 wt % to about 10 wt % breaker in water.

As used herein, the term "dilute solution" means a solution containing a low concentration of solute compared to solvent. In certain embodiments, "solute" refers to breaker, biocide, or other active ingredient. In certain embodiments, the solvent is aqueous and includes water.

In certain embodiments, a THP salt is present in the well treatment fluid in an amount that is effective to control or reduce a microbial population in the fluid. In certain embodiments, a THP salt is present in an amount of at least about 0.25 gallons of THP salt per thousand gallons of well treatment fluid (gpt) and can be up to about 0.75 gpt. In other embodiments, a THP salt and a quaternary ammonium compound ("quat") are present in the well treatment fluid. In certain embodiments, the THP salt/quat combination is present in an amount of at least about 0.1 gallons of THP salt/quat per thousand gallons of well treatment fluid (gpt) and can be up to about 0.3 gpt. These ranges for gpt correspond to a range from about 50 ppm to about 150 ppm biocide. The amount of THP salt or THP salt/quat used in the friction reducing treatment solution can be any value or range between any of the values recited above. In certain embodiments, the dilute solution contains from about 18 wt % to about 55 wt % THP salt in water. In certain embodiments, the dilute solution contains from about 45 wt % to about 55 wt % THP salt and quat in water.

In certain embodiments, a method for preparing a microbial viscosity breaker composition is provided. In a particular embodiment, the method includes the steps of obtaining a well treatment composition that includes a THP salt and at least one oxidizing viscosity breaker; and diluting the composition to form a diluted composition. In certain embodiments, the well treatment composition further includes a quaternary ammonium compound.

Also provided are methods for treating a subterranean formation that include the step of introducing a well treatment composition that includes a THP salt and at least one oxidizing viscosity breaker into the formation. In certain embodiments, the well treatment composition further includes a quaternary ammonium compound.

The present disclosure will further be described by reference to the following examples. The following examples are merely illustrative and are not intended to be limiting. Unless otherwise indicated, all percentages are by weight of the total composition.

Example 1

Viscosity Testing (Hydrogen Peroxide)

Sample Preparation.

Hydrogen Peroxide 7% was tested in conjunction with THPS to determine breaker compatibility under viscosity reducing conditions. Polyacrylamide at 1.0 gallons per thousand gallons of water was added to each slickwater sample tested. One sample containing only polyacrylamide was tested as a control. 1.0 gpt hydrogen peroxide 7% was tested alone, with 0.25 gpt THPS 20%, and with 0.25 gpt THPS 50%.

Sample Analysis.

All viscosity measurements were determined using a Cannon-Ubbelohde viscometer at 70° F. (ASTM D 445, D 446, ISO 3104 and ISO 3105). Viscosity measurements are reported in centistokes. Slickwater samples were mixed on a Waring blender for 3 minutes at 1500 rpms prior to initial viscosity readings. The samples rested in a water bath at 150° F. for 16 hours, then cooled to 70° F. before Final Viscosity readings were measured.

Figure 1:
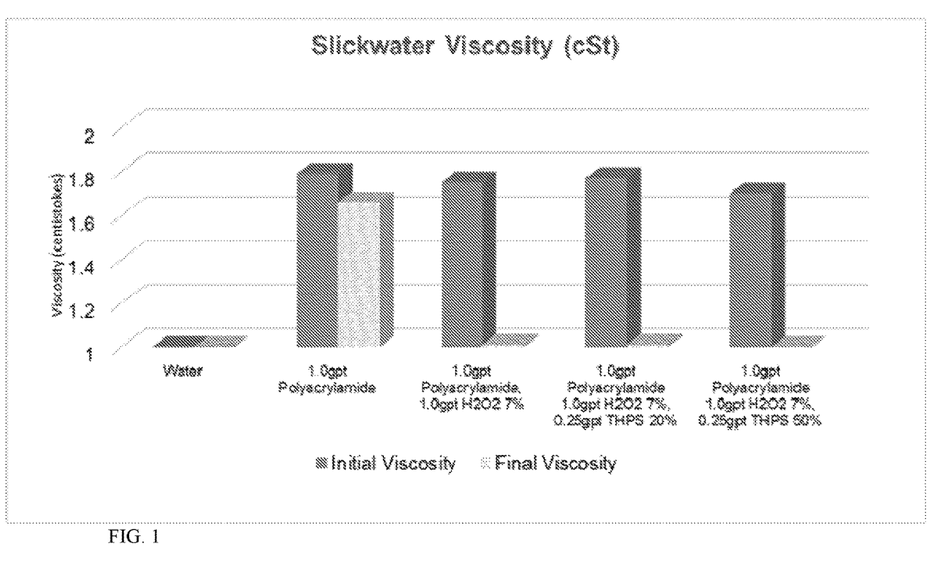
FIG. 1 provides a comparison of initial and final viscosities for various compositions in a hydrogen peroxide study.

Hydrogen peroxide 7% effectively reduces the viscosity of slickwater fluid down to that of water with and without THPS at typical loadings, indicating that no incompatibilities are present (FIG. 1).

Example 2

Viscosity Testing (Sodium Chlorite)

Sample Preparation.

Prepare 1000 mL of a guar gel fluid in water by combining 1.0 gpt choline chloride 62% and 6.0 gpt guar gel slurry and mixing using a Waring blender for 5 minutes. Mix 200 mL guar gel fluid on Waring blender. Prepare a crosslink fluid sample by adding the following to the guar gel fluid: (0.25 gpt Biocide (THPS 20% or 50%), 3.0 gpt Sodium Thiosulfate 30%, 1.0 gpt Sodium Hydroxide 35%, 2.0 gpt Sodium Chlorite 8%, 0.8 gpt Instant Crosslinker containing 20-25% potassium metaborate, and 2.0 gpt Delayed Crosslinker containing 15-40% of a borate salt blend. Control samples were similarly prepared with the biocide and/or breaker omitted from the sample.

Sample Analysis.

After mixing for 15 seconds, draw up 52 mL of a crosslink fluid sample in a 60 mL syringe and deposit into the sleeve of a Chandler 5550 viscometer. With a B5 bob installed on the viscometer, tare using Rheo 5000 software. Place the sleeve containing the crosslink sample onto the viscometer over the bob and screw into place. Put approximately 400 psi into the sample cup by turning the pressure valve to "PRESS". Start the viscometer using the Rheo 5550 viscometer using a schedule designed to reach bottomhole temperature in approximately 20 minutes and record viscosity at 100 sec-1. Record viscosity for 2 hours prior to cooling and cleaning bob and sleeve.

Figure 2:
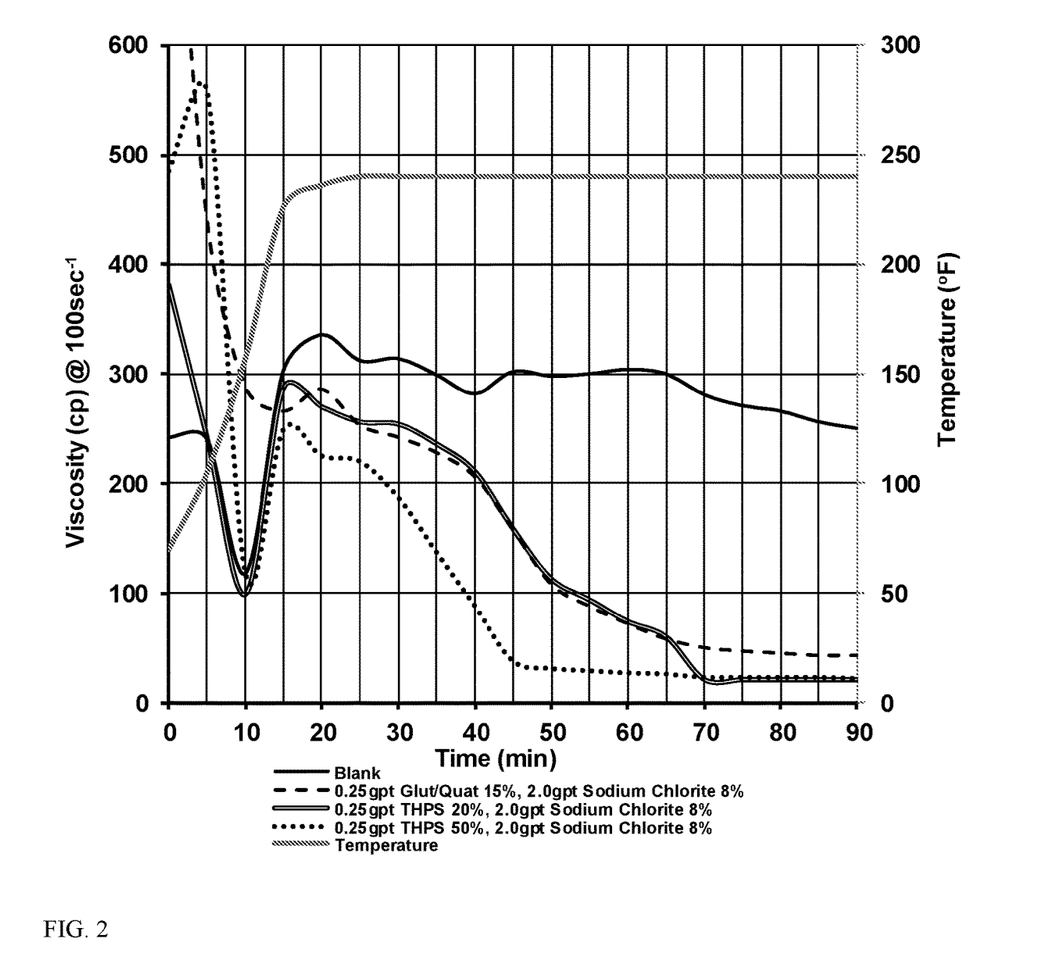
FIG. 2 provides a comparison of viscosity change for various compositions in a sodium chlorite study.

The tests performed indicate that the use of THPS does not interfere with the ability of sodium chlorite to effectively decrease crosslink viscosity. (FIG. 2).

Example 3

Viscosity Testing (Persulfates)

Sample Preparation.

Prepare 1000 mL of a guar gel fluid in water by combining 1.0 gpt choline chloride 62% and 7.5 gpt guar gel slurry and mixing using a Waring blender for 5 minutes. Mix 200 mL guar gel fluid on Waring blender. Several crosslink fluid samples were prepared. Sodium persulfate samples were prepared by adding the following to the guar gel fluid: (0.5 ppt, 0.75 ppt, or 1.0 ppt Sodium Persulfate, 0.5 gpt THPS 20%, 1.5 gpt borate crosslinker). A control sample was similarly prepared with 0.5 ppt Sodium Persulfate and no biocide. Encapsulated ammonium persulfate samples were prepared by adding the following to the guar gel fluid: (0.5 ppt, 0.75 ppt, or 1.0 ppt encapsulated ammonium persulfate, 1.0 gpt Sodium Hydroxide 25%, 0.5 gpt THPS/Quat 50%, 1.5 gpt borate crosslinker). A control sample was similarly prepared with 0.5 ppt encapsulated ammonium persulfate and no biocide.

Sample Analysis.

After mixing for 15 seconds, draw up 52 mL of a crosslink fluid sample in a 60 mL syringe and deposit into the sleeve of an Ofite 900 viscometer. With a B2 bob installed on the viscometer, place the sleeve containing the crosslink sample onto the viscometer over the bob and screw into place. Start the viscometer using the ORCADA software with a schedule designed to reach bottomhole temperature in approximately 20 minutes and record viscosity at 100 rpm. Record viscosity for 4 hours prior to cooling and cleaning bob and sleeve.

Figure 3:
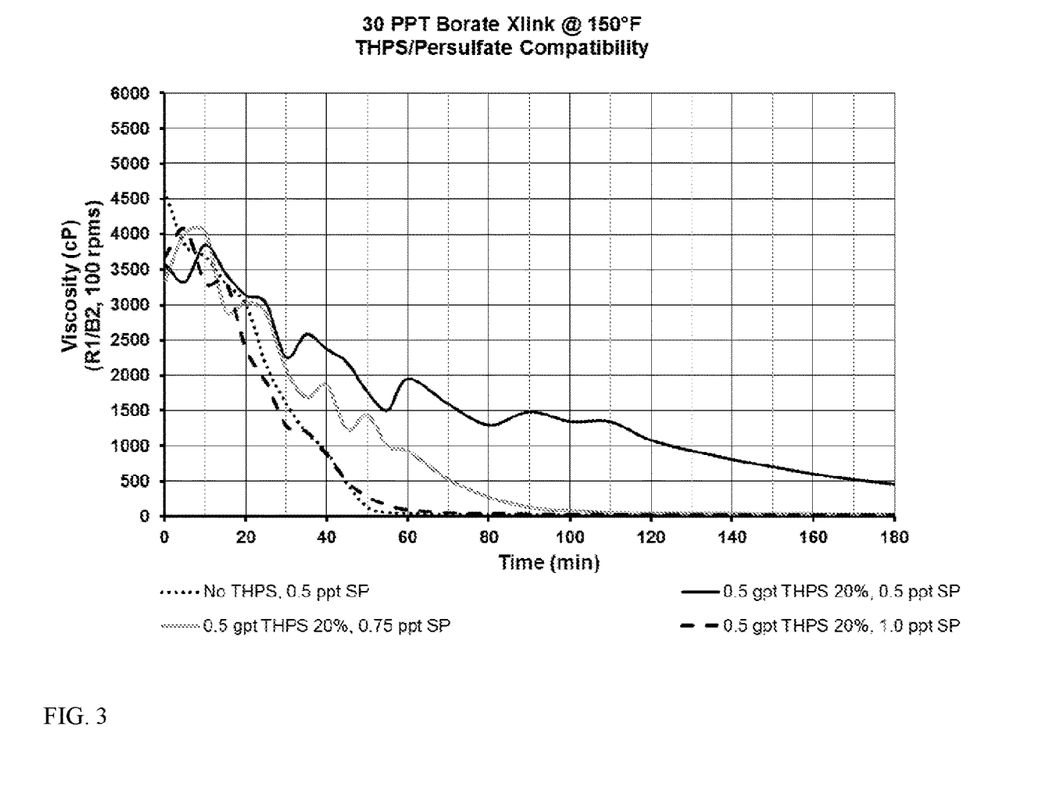
FIG. 3 provides a comparison of viscosity change for various compositions in a sodium persulfate study.
Figure 4:
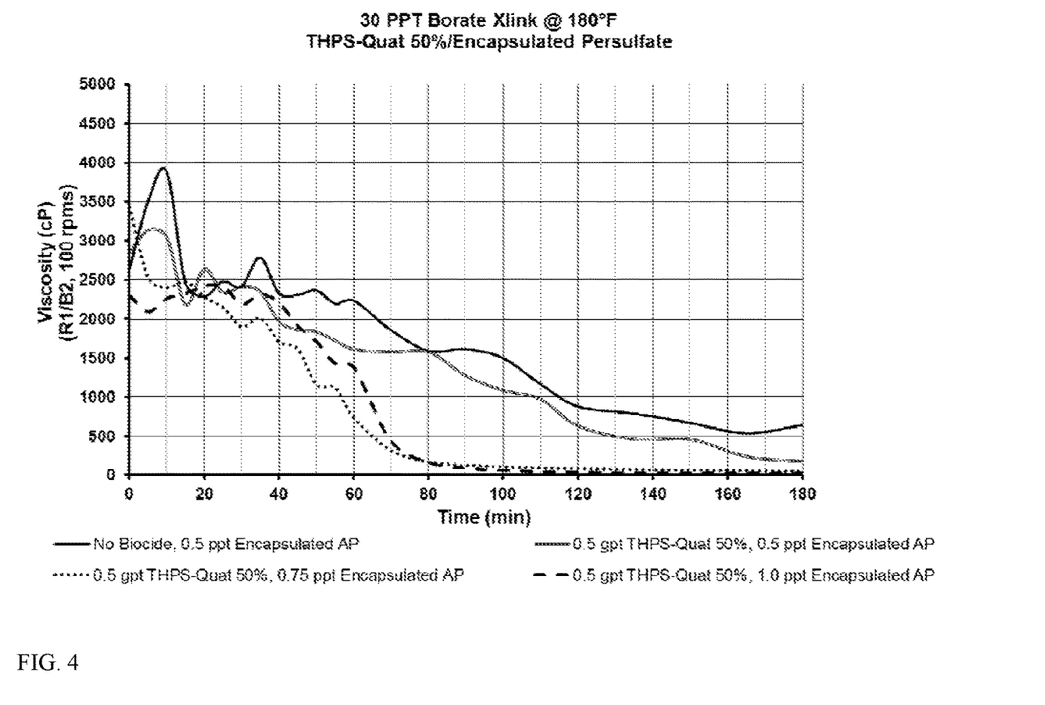
FIG. 4 provides a comparison of viscosity change for various compositions in an encapsulated ammonium persulfate study.

The tests performed indicate that the use of THPS with sodium persulfate or encapsulated ammonium persulfate breaker is preferred at higher concentrations of breaker. (FIGS. 3-4).

Example 4

Biocidal Activity Testing (Experiment #1)

Sample Preparation.

The biocidal activity of THPS/oxidizing breaker compositions against *Pseudomonas Fluorescens* was examined. In the first experiment, 2 L of well water was inoculated with 4 mL of a Nutrient Broth containing live *Pseudomonas f.* and stirred using an overhead mixer at 2000 rpm. After thorough mixing, and with the mixer running, 150 mL samples were taken with a syringe and inserted into separate bottles. The first and last bottles were left without biocide or breaker to act as controls. The remaining samples were treated with varying concentrations of biocide and oxidizing breakers. Table 1 lists the components and concentration of each sample tested.

TABLE 1

Experiment #1 Components and Concentrations.

| Biocide | Concentration | Breaker | Concentration |
|---|---|---|---|
| None (Control #1) | N/A | None | N/A |
| THPS 20% | 0.25 gpt | None | N/A |
| THPS 20% | 0.50 gpt | None | N/A |
| THPS 20% | 0.25 gpt | Sodium Persulfate | 1.0 ppt |
| THPS 20% | 0.50 gpt | Sodium Persulfate | 1.0 ppt |
| THPS 20% | 0.25 gpt | Hydrogen Peroxide 7% | 1.0 gpt |
| THPS 20% | 0.50 gpt | Hydrogen Peroxide 7% | 1.0 gpt |
| THPS 20% | 0.25 gpt | Sodium Chlorite 8% | 2.0 gpt |
| THPS 20% | 0.50 gpt | Sodium Chlorite 8% | 2.0 gpt |
| None | N/A | Sodium Persulfate | 1.0 ppt |
| None | N/A | Hydrogen Peroxide 7% | 1.0 gpt |
| None | N/A | Sodium Chlorite 8% | 2.0 gpt |
| None (Control #2) | N/A | None | N/A |

*Note:
"gpt" is equivalent to gallons per thousand gallons of water, "ppt" is equivalent to pounds per thousand gallons of water.

Sample Analysis.

Biocidal activity analysis was completed using a LUMI-NULTRA® PhotonMaster™ luminometer and Quench-Gone™ Organic Modified (QGO-M) ATP test kit. At the initial time (Time 0), both control samples were tested using the ATP kit. All samples were then left at ambient lab temperature (72° F.). All samples (20 mL each) were then tested using the ATP kit at one hour and at 24 hours.

Figure 5:
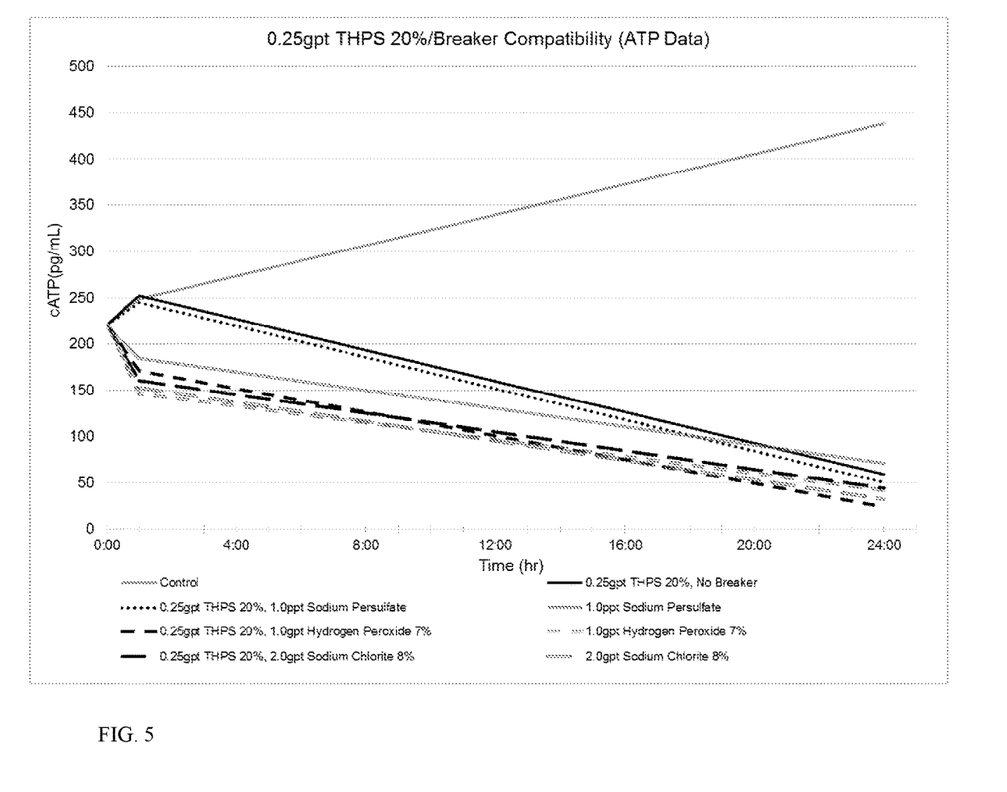
FIG. 5 is a graph depicting the impact of 0.25 gpt THPS (20%)/breaker on concentration of ATP.
Figure 6:
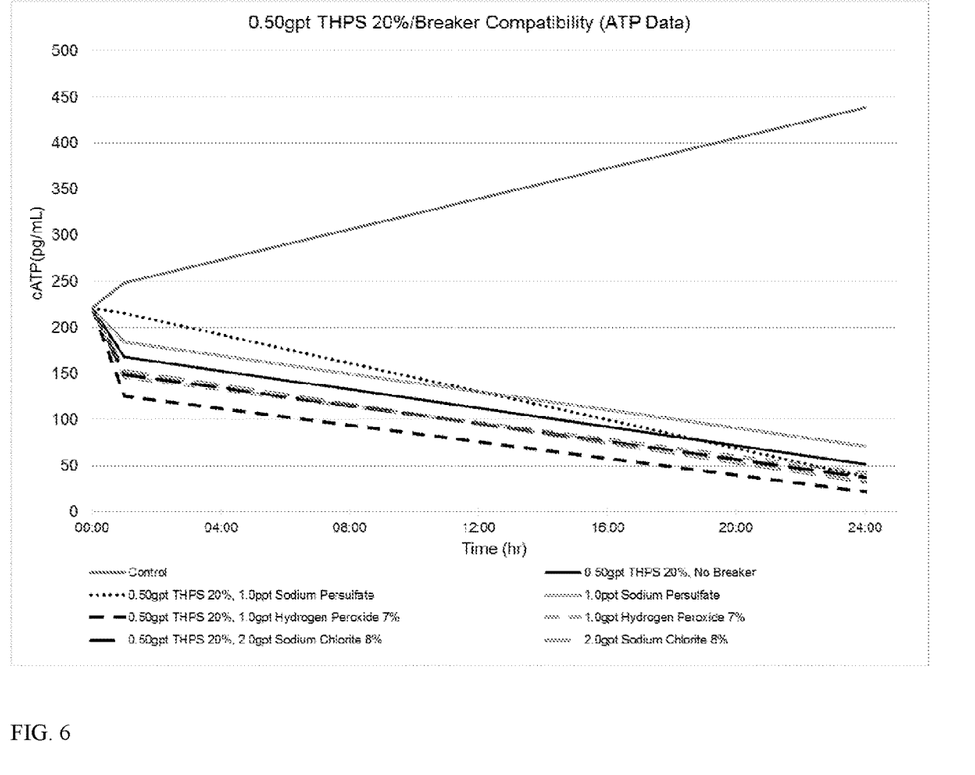
FIG. 6 is a graph depicting the impact of 0.50 gpt THPS (20%)/breaker on concentration of ATP.
Figure 7:
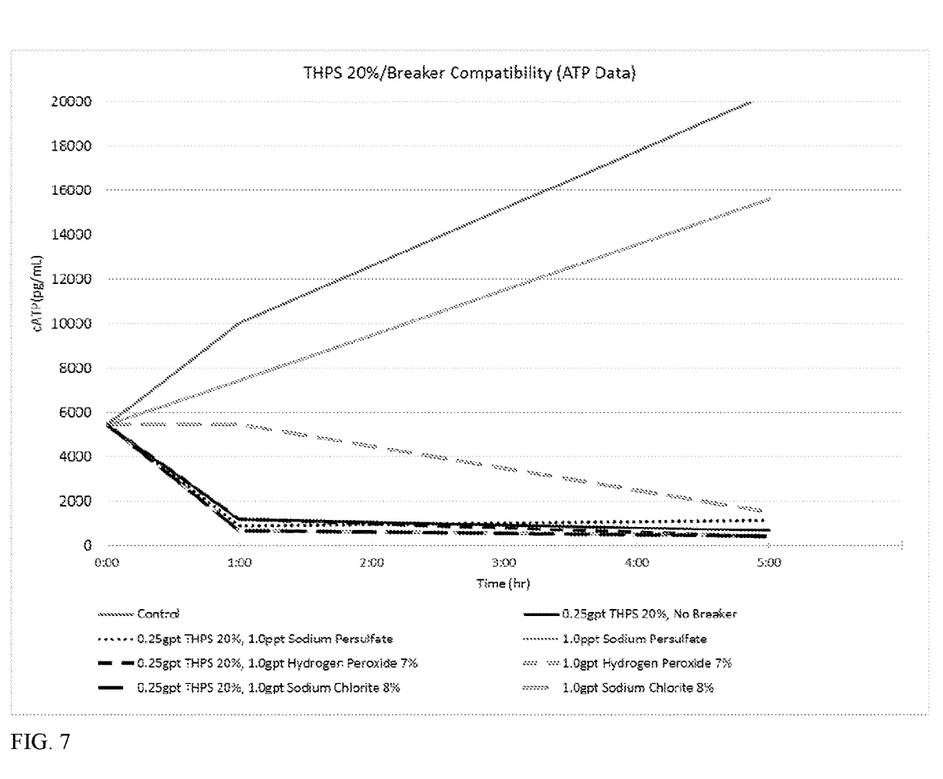
FIG. 7 is a graph depicting the impact of THPS (20%)/breaker on concentration of ATP.
Figure 8:
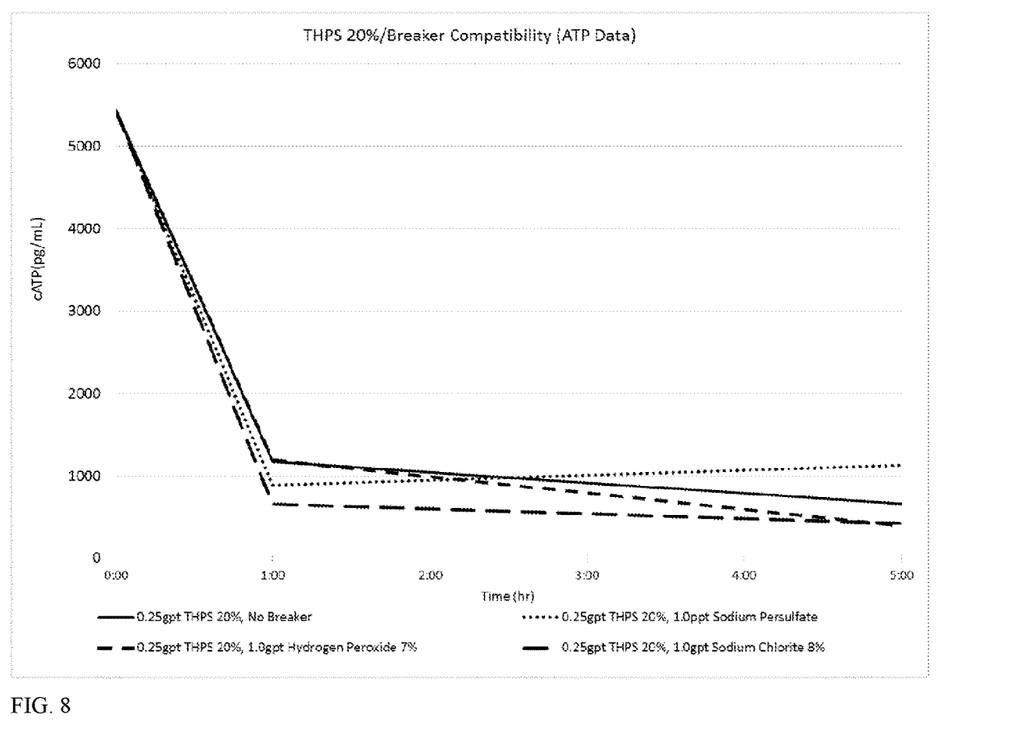
FIG. 8 is a graph depicting the impact of THPS (20%)/breaker on concentration of ATP.
Figure 9:
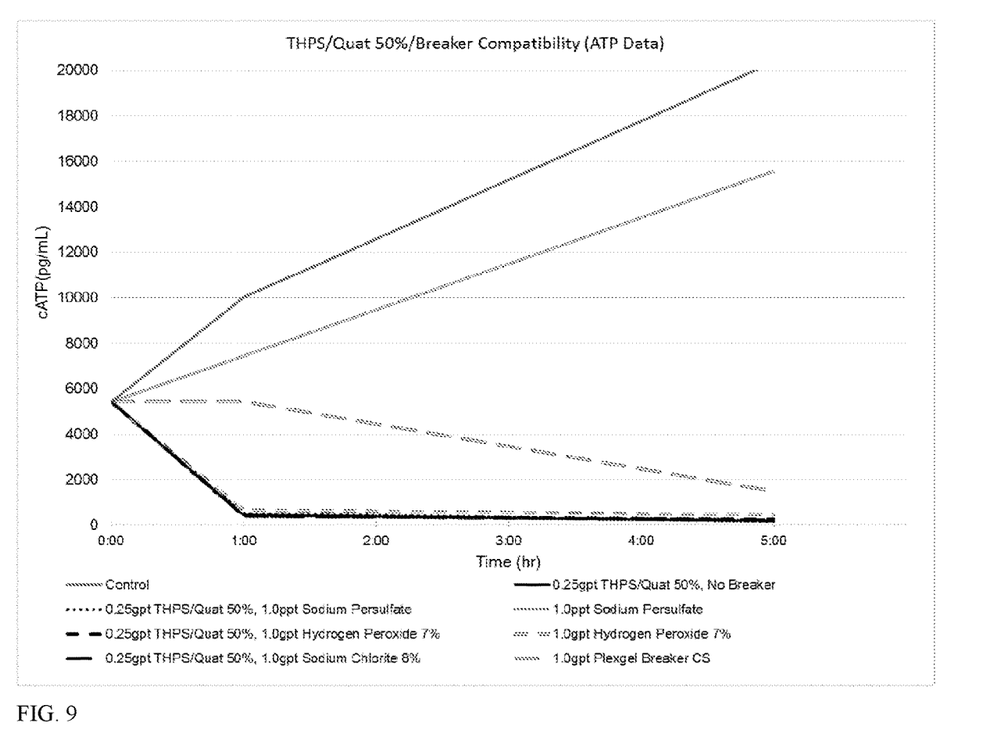
FIG. 9 is a graph depicting the impact of THPS/Quat 50%/breaker on concentration of ATP.
Figure 10:
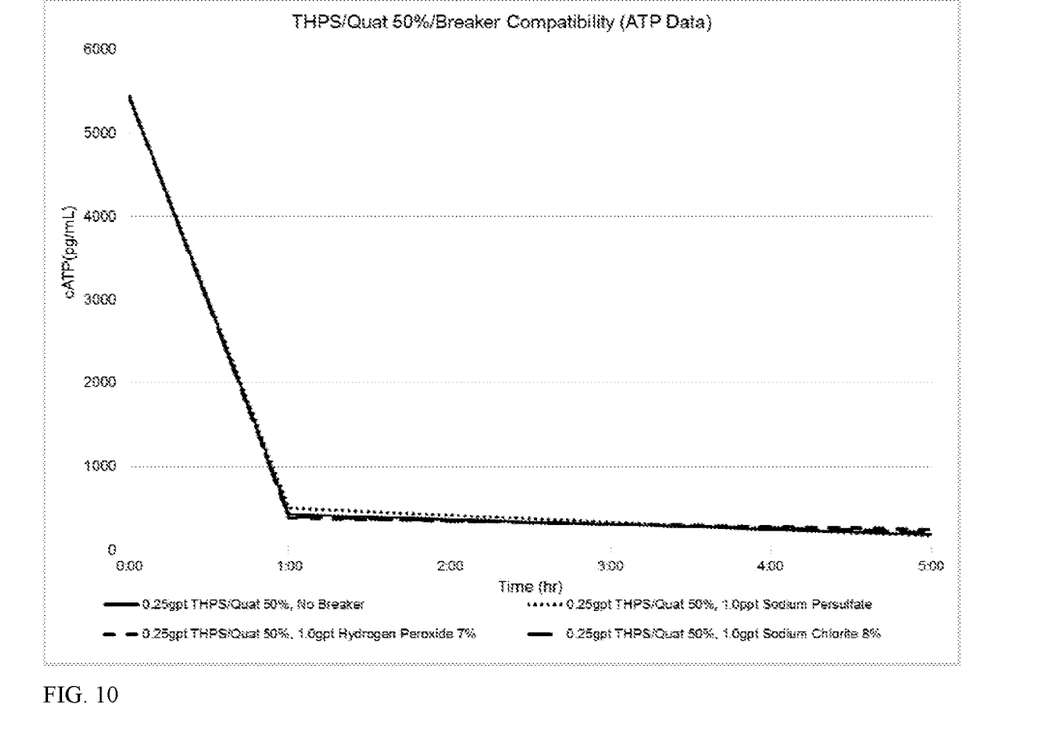
FIG. 10 is a graph depicting the impact of THPS/Quat 50%/breaker on concentration of ATP.

The results of the ATP analysis are plotted in FIGS. 5 and 6. Based upon these results, there is no apparent incompatibility between THPS and the oxidizing breakers. For example, at a THPS concentration of 0.25 gpt the addition of the breakers appears to enhance or accelerate the biocidal properties (FIG. 5).

Example 5

Biocidal Activity Testing (Experiment #2)

Sample Preparation.

500 mL of 1% KCl water, buffered with sodium bicarbonate to pH 7.7 was inoculated with 10 mL of a Nutrient Broth containing live *Pseudomonas f.* and blended on a Waring lab blender at 2000 rpm for 5 minutes. After blending, it was separated into 30 mL samples in separate bottles. The first and last bottles were left without biocide or breaker to act as controls. The remaining samples were treated with varying concentrations of biocide and oxidizing breakers. Table 2 lists the components and concentration of each sample tested.

TABLE 2

Experiment #2 Components and Concentrations.

| Biocide | Concentration | Breaker | Concentration |
|---|---|---|---|
| None (Control #1) | N/A | None | N/A |
| THPS 20% | 0.25 gpt | None | N/A |
| THPS 20% | 0.25 gpt | Sodium Persulfate | 1.0 ppt |
| THPS 20% | 0.25 gpt | Hydrogen Peroxide 7% | 1.0 gpt |
| THPS 20% | 0.25 gpt | Sodium Chlorite 8% | 1.0 gpt |
| THPS/QUAT** 50% | 0.25 gpt | None | N/A |
| THPS/QUAT 50% | 0.25 gpt | Sodium Persulfate | 1.0 ppt |
| THPS/QUAT 50% | 0.25 gpt | Hydrogen Peroxide 7% | 1.0 gpt |
| THPS/QUAT 50% | 0.25 gpt | Sodium Chlorite 8% | 1.0 gpt |
| None | N/A | Sodium Persulfate | 1.0 ppt |
| None | N/A | Hydrogen Peroxide 7% | 1.0 gpt |
| None | N/A | Sodium Chlorite 8% | 1.0 gpt |
| None (Control #2) | N/A | None | N/A |

*Note:
"gpt" is equivalent to gallons per thousand gallons of water, "ppt" is equivalent to pounds per thousand gallons of water.
**QUAT = Benzalkonium chloride (CAS No. 68424-85-1).

Sample Analysis.

Biocidal activity analysis was completed using a LUMI-NULTRA® PhotonMaster™ luminometer and Quench-Gone™ Organic Modified (QGO-M) ATP test kit. At the initial time (Time 0), both control samples were tested using the ATP kit. All samples were then incubated at 77° F. All samples (5 mL) were then tested using the ATP kit at one hour and again at 5 hours.

The results of the ATP analysis are plotted in FIGS. 7-10. Experimental results demonstrate that THPS provides similar biocidal action against *Pseudomonas Fluorescens* with and without the addition of the oxidizing breakers. Furthermore, the results indicate that with the addition of hydrogen peroxide 7% or sodium chlorite 8%, the decrease in microbial activity may be accelerated or enhanced slightly.

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

We claim:

1. A well treatment fluid composition comprising a tetrakis(hydroxyorgano)phosphonium salt, a quaternary ammonium compound, a copolymer of an unsaturated carboxylic acid with a sulphonic acid said copolymer terminated by vinylidene-1,1-diphosphonic acid (VDPA) or has such monomer incorporated into the polymer backbone, and at least one oxidizing viscosity breaker, wherein the oxidizing viscosity breaker is present in an amount from about 15 ppm to about 250 ppm.

2. The composition of claim 1, wherein the tetrakis(hydroxyorgano)phosphonium salt is selected from the group consisting of tetrakis(hydroxymethyl)phosphonium sulphate, tetrakis(hydroxymethyl)phosphonium chloride, tetrakis(hydroxymethyl)phosphonium phosphate, tetrakis(hydroxymethyl)phosphonium nitrate and tetrakis(hydroxymethyl)phosphonium oxalate.

3. The composition of claim 1, wherein the tetrakis(hydroxyorgano)phosphonium salt is present in an amount from about 40 ppm to about 250 ppm.

4. The composition of claim 1, wherein the quaternary ammonium compound is present in an amount from about 5 ppm to about 50 ppm.

5. The composition of claim 1, wherein the oxidizing viscosity breaker is selected from the group consisting of hydrogen peroxide, sodium persulfate, encapsulated ammonium persulfate, and sodium chlorite.

6. A method for preparing a microbial viscosity breaker composition comprising the steps of:
 a. obtaining the composition of claim 1; and
 b, diluting the composition to form a diluted composition.

7. The method of claim 6, wherein the tetrakis(hydroxyorgano)phosphonium salt is selected from the group consisting of tetrakis(hydroxymethyl)phosphonium sulphate, tetrakis(hydroxymethyl)phosphonium chloride, tetrakis(hydroxymethyl)phosphonium phosphate, tetrakis(hydroxymethyl)phosphonium nitrate and tetrakis(hydroxymethyl)phosphonium oxalate.

8. The method of 6, wherein the oxidizing viscosity breaker is selected from the group consisting of hydrogen peroxide, sodium persulfate, encapsulated ammonium persulfate, and sodium chlorite.

9. A method for treating a subterranean formation comprising the step of introducing the composition of claim 1 into the formation.

10. The method of claim 9, wherein the tetrakis(hydroxyorgano)phosphonium salt is selected from the group consisting of tetrakis(hydroxymethyl)phosphonium sulphate, tetrakis(hydroxymethyl)phosphonium chloride, tetrakis(hydroxymethyl)phosphonium phosphate, tetrakis(hydroxymethyl)phosphonium nitrate and tetrakis(hydroxymethyl)phosphonium oxalate.

11. The method of claim 9, wherein the oxidizing viscosity breaker is selected from the group consisting of hydrogen peroxide, sodium persulfate, encapsulated ammonium persulfate, and sodium chlorite.

* * * * *